Jan. 8, 1963   V. R. JENKINS   3,072,004
SEVERING APPARATUS
Filed July 31, 1959   6 Sheets-Sheet 1

INVENTOR
VICTOR REX JENKINS
BY
Steward & Steward
his ATTORNEYS.

INVENTOR
VICTOR REX JENKINS
BY Steward & Steward
his ATTORNEYS.

INVENTOR
VICTOR REX JENKINS

United States Patent Office 3,072,004
Patented Jan. 8, 1963

3,072,004
SEVERING APPARATUS
Victor Rex Jenkins, Des Moines, Iowa, assignor to The Armstrong Rubber Company, West Haven, Conn., a corporation of Connecticut
Filed July 31, 1959, Ser. No. 830,764
6 Claims. (Cl. 83—318)

This invention relates to improvements in apparatus for severing elongated sheet material into predetermined lengths as the material travels on a conveyor, and it relates more particularly to apparatus known in the rubber tire industry as tread skivers.

In the manufacture of rubber tires, the rubber stock used in the tread portion of the tire is first extruded in a continuous strip or ribbon of rubber onto a conveyor where it is permitted to cool and partially cure. Since this tacky rubber strip is continuously extruded at speeds of as much as 60 feet or more per minute, it must be kept moving at a corresponding speed in order to prevent it from becoming wrinkled or folded. The moving ribbon of tread stock is then cut into strips of precise lengths, which are subsequently wrapped circumferentially around the outer surfaces of the tires during their manufacture. In order that the completed tire will be properly balanced, it is extremely important that the tread rubber be uniform in thickness circumferentially of the tire. It is essential therefore when the tread stock is applied to the tire for the ends of the stock to meet exactly, usually in a lap-joint. The length to which the tread stock is cut must accordingly be exceedingly accurate.

Because of the care and accuracy required for this cutting operation, as well as the fact that tread skivers for performing it have in the past been necessarily massive in size, such machines have been incapable of operating satisfactorily above certain speeds and have therefore become more and more of a bottleneck in the production of rubber tires. Such machines consists principally of a cutter supported on a movable carriage which travels with the tread stock during the relatively short time that the cut is being made. In one type of machine frequently used for this purpose, a circular knife blade is driven by a motor mounted on the carriage for movement into and out of cutting relation with the tread stock, while at the same time being movable on the carriage transversely of the tread in order to cut across the width of the tread rubber. The conveyor belt on which the tread stock is carried passes around guide-rollers which conduct the conveyor belt away from the area where the blade of the saw passes through the tread stock so that the blade does not come into contact with the belt. The guide-rollers are mounted on the carriage for the cutter so that they move longitudinally of the tread stock in unison with the cutter, thereby at all times maintaining the conveyor belt out of contact with the cutter.

In prior apparatus of the type outlined above, it has been necessary to drive the cutter carriage in synchronism with the conveyor belt, i.e. at the speed that the tread stock is traveling. In most cases, this has been accomplished by chain or gear drives between the drive mechanism for the conveyor belt and that for the carriage.

The purpose of the present invention is to simplify the drive for the cutter carriage in apparatus of this type and especially to do away with the more or less complicated and cumbersome chain or gear mechanisms heretofore used in driving the cutter carriage. A principal object of the invention is to make such machines more compact and to increase their speed of operation, thereby increasing their capacity. Another object of the invention is to minimize the maintenance required by such apparatus.

With the above objects in view and some others which will be apparent to those skilled in the art from the description hereinafter, apparatus embodying the invention comprises an endless conveyor belt on which sheet material is conveyed from a place where it is formed in a continuous strip, and means for locking a cutter carriage to said conveyor belt so that it will move in unison therewith, such locking being accomplished by preventing rotation of one or more carriage-mounted guide elements or rollers over which the belt is trained. This prevents the conveyor belt and, therefore, the material conveyed thereby from moving relative to the knife blade as the cut is made, the blade and mounting carriage therefor moving in unison with the material as it is conveyed without interruption on said conveyor belt.

The present invention provides distinct advantages over apparatus employed heretofore in that it eliminates inaccuracies due to improper synchronization of the forward speed of the carriage with that of the material being cut. Moreover, because of the manner in which it is constructed, greater speed is obtainable in apparatus according to the invention, thereby relieving the production bottleneck caused to a large extent by the small capacity of existing tread skivers.

An apparatus embodying the invention in its most advantageous form is illustrated in the accompanying drawings, in which FIG. 1 is a perspective view of a tire tread skiver without the tread stock shown thereon;

Figure 2:
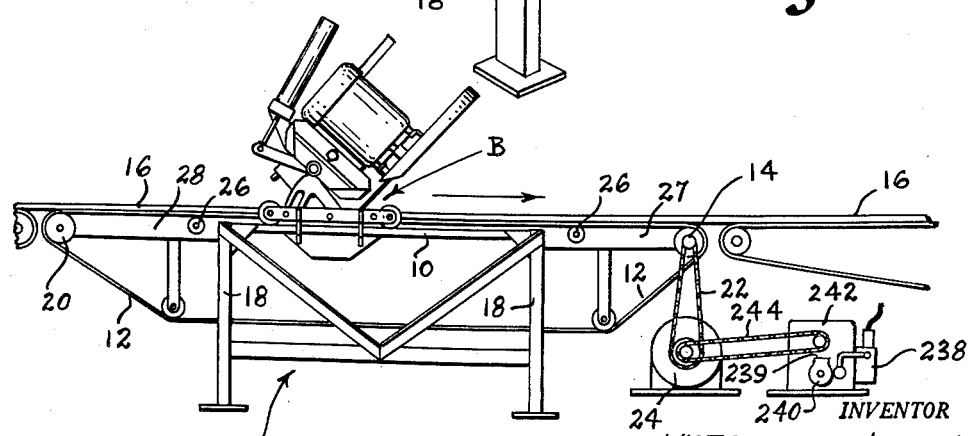
FIG. 2 is a more or less diagrammatic view in side elevation of a conveyor system in which the tread skiver is placed for cutting a strip of tread rubber into predetermined lengths.
Figure 3:
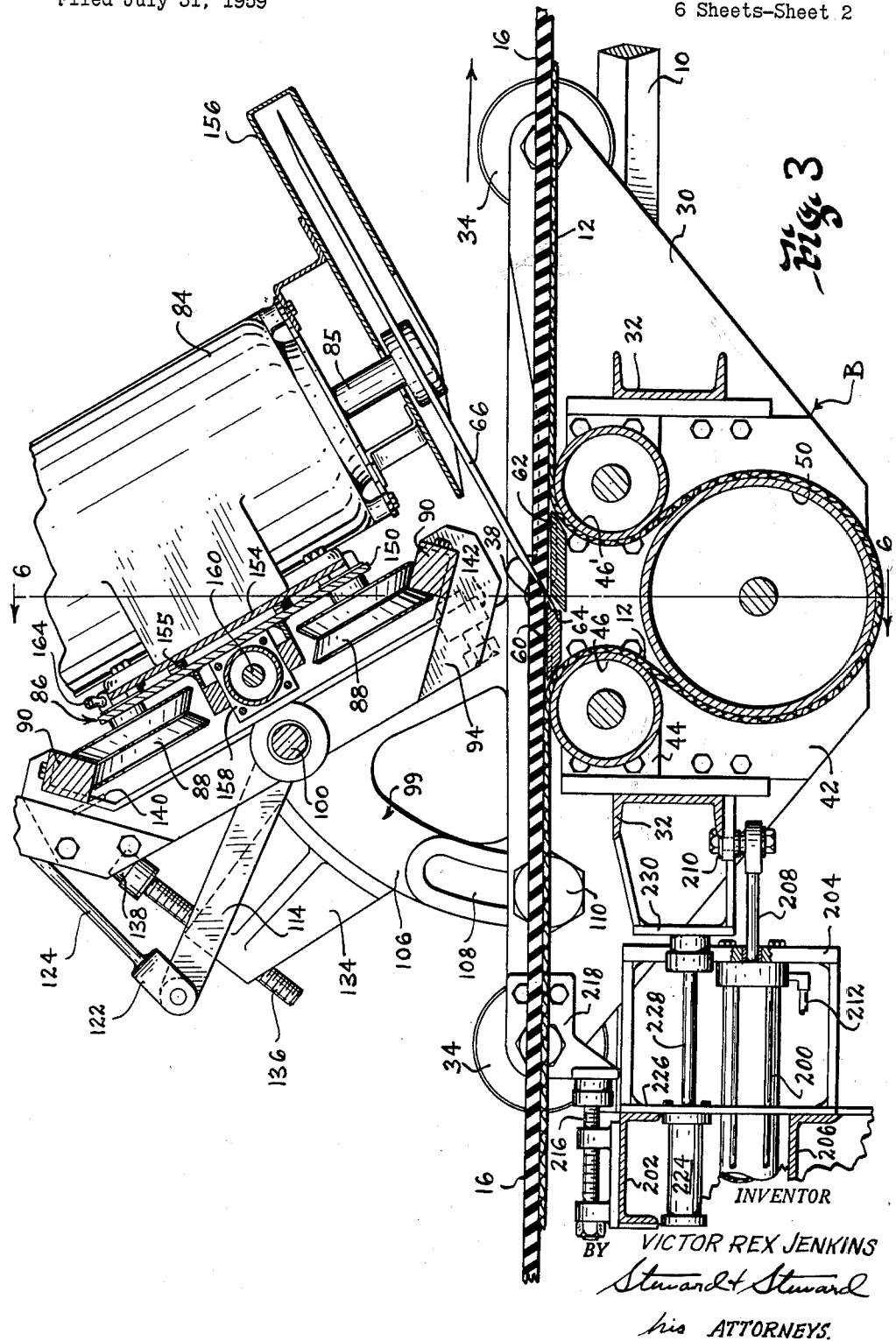
FIG. 3 is a vertical section taken longitudinally of the apparatus approximately on the line 3—3 of FIG. 1 and showing the cutter carriage in its starting position with the knife blade lowered into position for the start of a cut, portions of the tread stock being shown as it passes through the apparatus.

As shown in the drawings, a main frame indicated generally at A, supports a cutter carriage B for horizontal movement on a pair of side rails 10. Carriage B travels back and forth along rails 10 parallel to an endless conveyor belt 12, the top run of which lies in substantially the same plane as rails 10 and extends forwardly to a drive-roller 14 in a conveyor system for carrying a continuous strip of tread rubber 16 (FIGS. 2 and 3). Belt 12 is trained around roller 14 and passes back along the underside of frame A between legs 18 thereof to another roller 20 rearwardly of frame A, thence forwardly again between rails 10.

Belt 12 is driven at a linear speed equal to the speed at which the strip of tread rubber is delivered to the belt from a previous belt in the train of conveyor means, the rubber strip being initially formed by an extruding machine (not shown) which delivers it to said conveyor means. Roller 14 is driven through a chain 22 by a motor 24 (FIG. 2) at the desired speed. Belt 12 is supported on either side of frame A by a pair of rollers 26 journaled in oppositely extending auxiliary frames 27 and 28, on which main rollers 14 and 20, respectively, are mounted.

Figure 6:
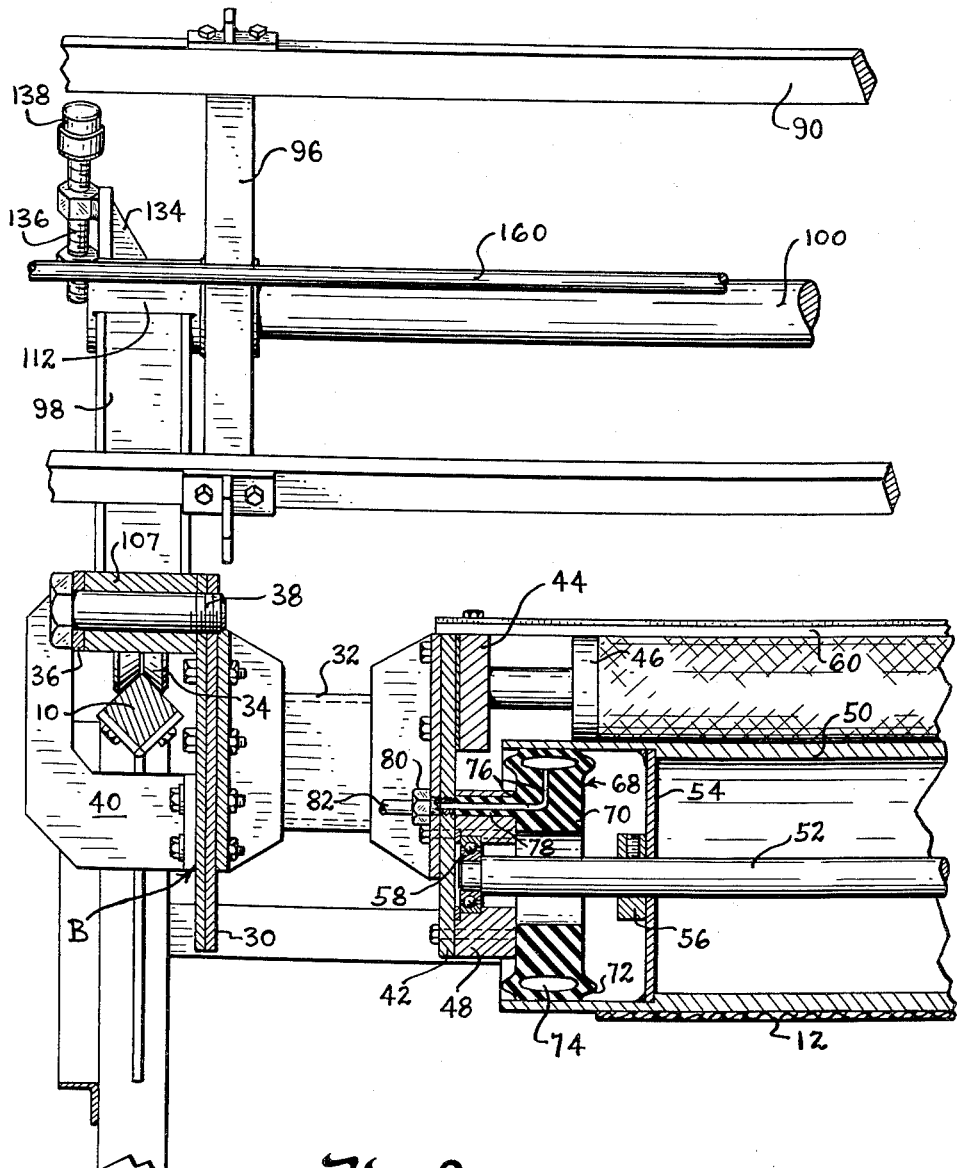
FIG. 6 is a partial transverse section taken on the line 6—6 of FIG. 3, with the cross-cut table and cutter removed.

Carriage B has a frame consisting of triangularly shaped side plates 30 and outwardly facing channel beams 32, which connect side plates 30. Mounted at each end of the upper edges of plates 30 are freely rotatable wheels 34 on which carriage B is supported. Wheels 34 are circumferentially grooved so as to straddle rails 10 of frame A, which are rectangular in cross-section and supported so that one corner is directed into and received by the V-grooves in wheels 34, as shown in FIG. 6. By this arrangement wheels 34 of carriage B are made self-retaining on rails 10. The outer sides of wheels 34 are supported by braces 36 secured at their centers to the upper edges of plates 30 by means of bolts 38 and on both sides to heavy brackets 40, which extend outwardly from the lower portions of plates 30 under rails 10 and then upwardly into engagement with braces 36 to which brackets 40 are welded.

Figure 4:
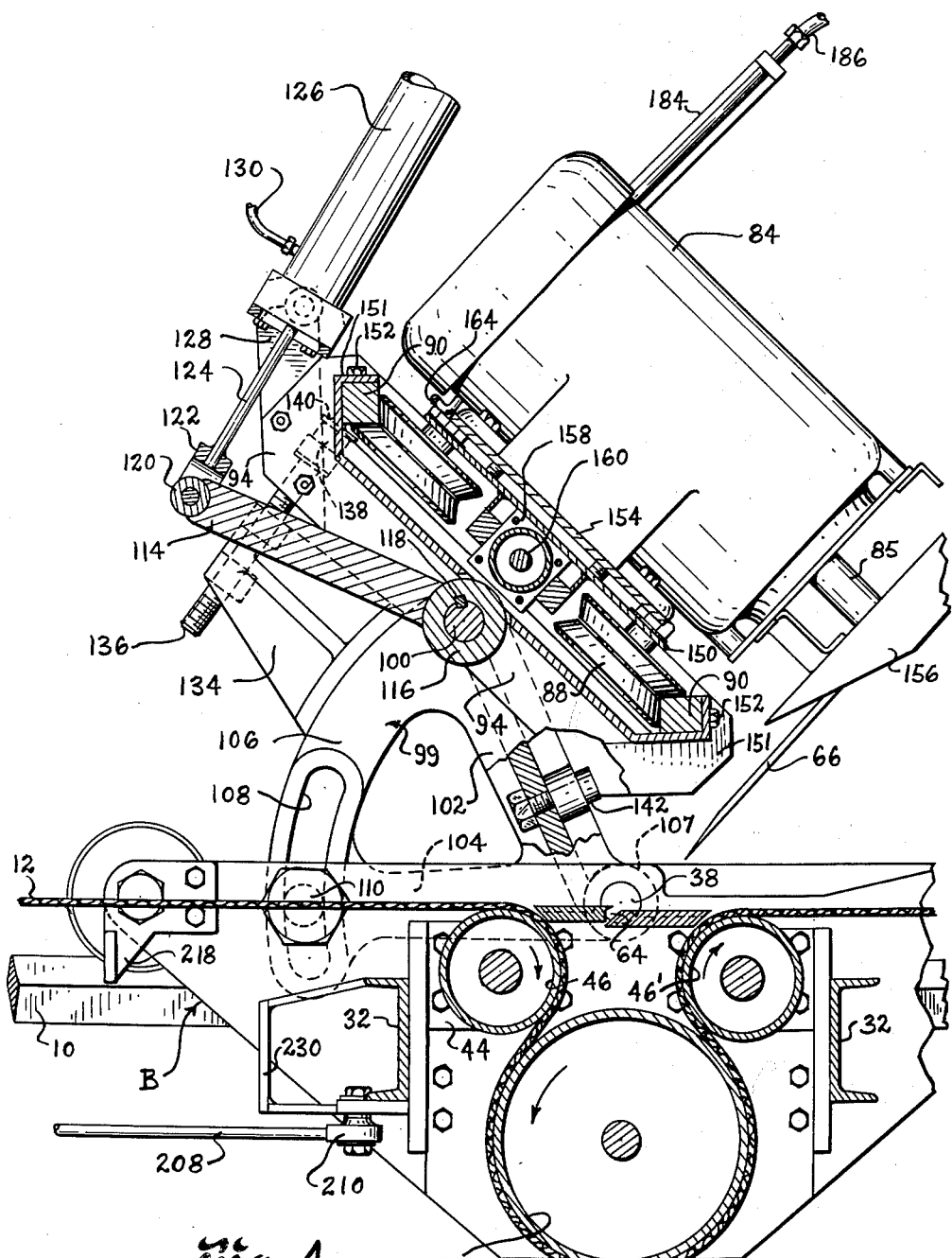
FIG. 4 is a view similar to FIG. 3, but with the section taken through the central portions of the cross-track assembly with the cross-cut table located centrally thereof and the knife blade raised out of cutting position, the cutter carriage having been moved forward from its starting position as if during a cut, certain portions of the apparatus being broken away for purposes of clarity.

Between channel beams 32 of carriage B and spaced somewhat inwardly of plates 30 are secured roller mounting panels 42, on the inner faces of which are bolted a bearing block 44 for a pair of horizontally disposed guide-rollers 46, 46' and another bearing block 48 (FIG. 6) below this for a hollow friction roller 50. Guide-rollers 46, 46' and roller 50 form a roller assembly about which conveyor belt 12 is trained as shown in FIGS. 3 and 4 in a manner generally similar to guide-rollers presently used solely for the purpose of depressing the belt away from the cutter blade. The upper surfaces of guide-rollers 46, 46' lie substantially in the same plane with the tread stock 16, friction roller 50 being substantially larger in diameter than each of guide-rollers 46, 46' for a purpose which will be explained hereinafter. In the arrangement shown, the diameter of roller 50 is desirably about twice that of rollers 46, 46'. As best shown in FIG. 6, roller 50 is mounted on an axle 52 which extends through a mounting plate 54 spaced a short distance inwardly from each end of roller 50. Plate 54 is welded along its periphery to the inner surface of roller 50, and has a collar 56 fixed to it, by which roller 50 is mounted rigidly on axle 52 by means of a setscrew. The outer ends of axle 52 are journaled within roller or ball bearings 58 in bearing blocks 48.

As conveyor belt 12 travels from main roller 20 in the conveyor system, it passes over guide-roller 46 into engagement with roller 50, around the under side thereof, and then over guide-roller 46' to the drive-roller 14 (FIG. 2). A pair of cutting bars 60, 62 are mounted on the upper edges of roller mounting panels 42 between and parallel to guide-rollers 46, 46'. The adjacent edges of cutting bars 60 and 62 are correspondingly beveled to form a slot 64, into which the cutting edge of a rotary blade 66 of a cutter supported by carriage B may extend, as will be more apparent hereinafter. As conveyor belt 12 travels toward cutter blade 66, it passes under cutting bar 60 to roller 50 and back up again in front of the cutter blade 66, passing between cutting bar 62 and guide-roller 46'. The strip of tread rubber 16 carried on belt 12 passes over cutting bars 60, 62 where it is in position to be severed by blade 66.

An important feature of the invention consists in locking the carriage B to the belt 12 by preventing rotation of the roller assembly on the carriage, thereby preventing movement of the tread rubber with respect to the cutting blade 66. This is accomplished in the embodiments shown in the drawings by stopping rotation of the friction roller 50, causing carriage B to be locked to belt 12, and in effect to the material being cut, until the cut is complete. Since the conveyor belt 12 continues to move forwardly along frame A, carriage B must also move with belt 12 on rails 10 during a cutting stroke of blade 66. After a cut has been made, roller 50 is released, and carriage B is returned to its starting position, shown in FIG. 3.

In order to stop rotation of friction roller 50, as mentioned above, an air clutch or brake 68 (FIG. 6) is mounted within one end of roller 50 and is anchored against rotation to bearing block 48. Air clutch 68 may be, for example, a Fawick "Airflex" clutch consisting of a rubber or rubber-like tube, similar to a pneumatic tire, but having a heavy solid rubber central portion 70 rigidly fixed to bearing block 48 and a hollow peripheral portion 72, which expands upon introduction of air pressure within its annular space 74 into contact with the inner cylindrical surface of roller 50. An air passage 76 extends radially from the space 74 into the central portion 70 of the clutch device 68 and then outwardly through a stem 78, which fits through bearing block 48 and is connected to a fitting 80 in the outer side of mounting plate 42 for a flexible air hose 82 leading to an air control valve. It will be apparent from the foregoing that when air is introduced under pressure to clutch 68, expanding its periphery 72 outwardly into contact with roller 50, the latter will be unable to rotate. It will also be seen that one reason for making roller 50 larger in diameter than guide-rollers 46, 46' is to increase the area of contact between it and belt 12 in order to prevent any slippage of the belt on roller 50 when clutch 68 is engaged, thereby ensuring that there is no relative movement of the tread rubber 16 with respect to carriage B as the tread is being cut. It will accordingly be understood that the term "frictional engagement," as used hereinafter to describe the engagement of the conveyor belt with the roller or rollers about which the belt is trained, means an engagement which positively prevents slippage between the conveyor belt and the roller or rollers with which it is thus engaged.

Figure 1:
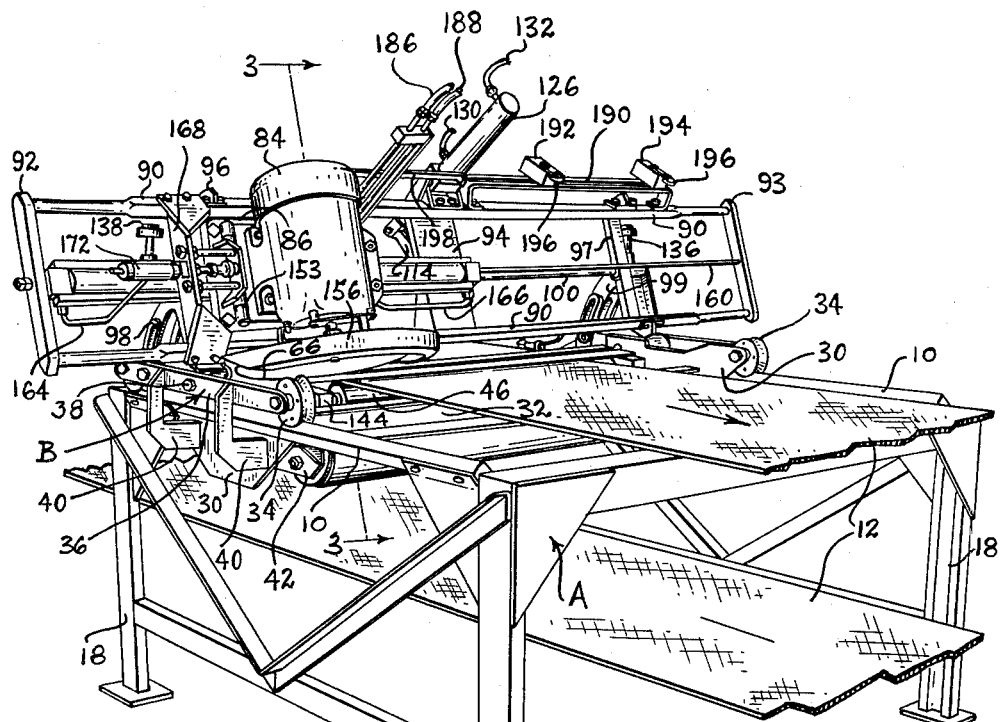

Carriage B supports a high powered cutter motor 84 having a shaft 85 on which rotary blade 66 is mounted, motor 84 being so mounted as to tilt blade 66 toward and away from the tread rubber 16 on conveyor belt 12, lowering the blade into cutting position, as shown in FIG. 3, and lifting it to a raised position, as shown in FIG. 4. To this end, motor 84 is rigidly mounted on a cross-cut table 86, which in turn glides on four wheels 88 along cross-rails 90. Cross-rails 90 are braced at their opposite ends by end-plates 92, 93. A heavy center bracket 94 (FIG. 1) and a pair of mounting brackets 96, 97 located inwardly of end-plates 92, 93 pivotally mount the whole cross-track or cutter assembly, including rails 90, table 86 and motor 84, so that it will tilt downwardly and forwardly or generally in the direction in which the tread stock 16 travels. As best seen in FIGS. 1, 3 and 4, the tiltable cutter assembly is supported on carriage B by a pair of adjustable side supports 98, 99, rigidly secured to side plates 30 of carriage B and having a pivot shaft 100 fixed between them. Brackets 94, 96 and 97 of the cutter assembly are journaled on shaft 100, thereby permitting the tilting movement of this assembly as a unit.

For strength purposes, side supports 98, 99 are box-like structures and generally delta-shaped as viewed in FIG. 4, each comprising an upwardly extending webbed leg 102, a generally horizontal leg 104 and a pair of arcuate legs 106 joining the outer ends of legs 102 and 104. Bolt 38 extends through a boss 107 (positioned between side plate 30 and brace 36, FIG. 6) at the intersection of legs 102 and 104 in order to fix the forward end of each support 98, 99 to carriage B. An elongated slot 108 extending longitudinally of arcuate legs 106 adjustably receives a mounting bolt 110 which extends through each side plate 30 and brace 36 to secure the rearward ends of supports 98, 99. It will be clear that the angle at which blade 66 cuts the tread 16 can be adjusted by loosening bolts 38 and 110 and pivoting the whole cross-cut assembly about bolt 38. By reference to FIG. 3, in which the cutting blade is shown in its cutting position, it will be seen that blade 66 passes through the center of bolt 38 and that accordingly angular movement only is imparted to blade 66 upon adjustment of supports 98, 99.

Pivot shaft 100 is supported in a boss 112 (FIG. 6) in the upper corner of each support 98, 99 and is keyed or otherwise rigidly fixed thereto so that it can not rotate with respect to supports 98, 99. As may be seen in FIG. 4, an arm 114 extends rearwardly from the central portion of pivot shaft 100 and is rigidly secured thereto adjacent bracket 94 of the cross-track. Arm 114 is provided at its lower end with an enlarged cylindrical portion 116 through which shaft 100 fits, a key 118 being provided in keyways between shaft 100 and portion 118 in order to positively prevent rotation between these members. The outer end 120 of arm 114 is pivoted to a link 122 at the end of a piston rod 124 extending downwardly from a pneumatic cylinder 126 (FIGS. 1 and 4) disposed with its longitudinal axis approximately perpendicular to the plane formed by cross-rails 90. Cylinder 126 is pivotally mounted, as indicated in FIG. 4, on a brace 128, extending upwardly from and bolted to central bracket 94 of the cross-cut assembly. Air pressure is introduced to cylinder 126 through flexible hose connections 130 and 132 at opposite ends of cylinder 126 for tilting the cutter assembly, including motor 84, up or down about pivot shaft 100, thereby raising and lowering blade 66 with respect to tread rubber 16.

Each of support members 98, 99 has welded along the outer upper edges of its arcuate member 106, a mounting post 134, at the outer end of which is threadedly held an adjustable stop-element 136, against which the under edge of the upper cross-rail 90 will rest, thereby positively limiting the pivotal movement of the cutter assembly in one direction. Stop-elements 136 each are provided with a heavy rubber bumper 138 at its upper end for engagement with a plate 140 or other suitable flat surface on the under side of upper rail 90, as shown in FIG. 4. The height to which blade 66 can be raised is accordingly readily adjusted by raising or lowering stop-elements 136. Tilting of the cutter assembly in the opposite direction is limited by a pair of heavy rubber bumpers 142 (FIG. 4) mounted in the central web-portion at the lower end of leg 102 of each support member 98, 99. As the cutter assembly is rocked forwardly by means of power cylinder 126, the under side of the lower cross-rail 90 thereof comes into engagement with bumpers 142, arresting further tilting movement of the cutter assembly in that direction.

Figure 5:
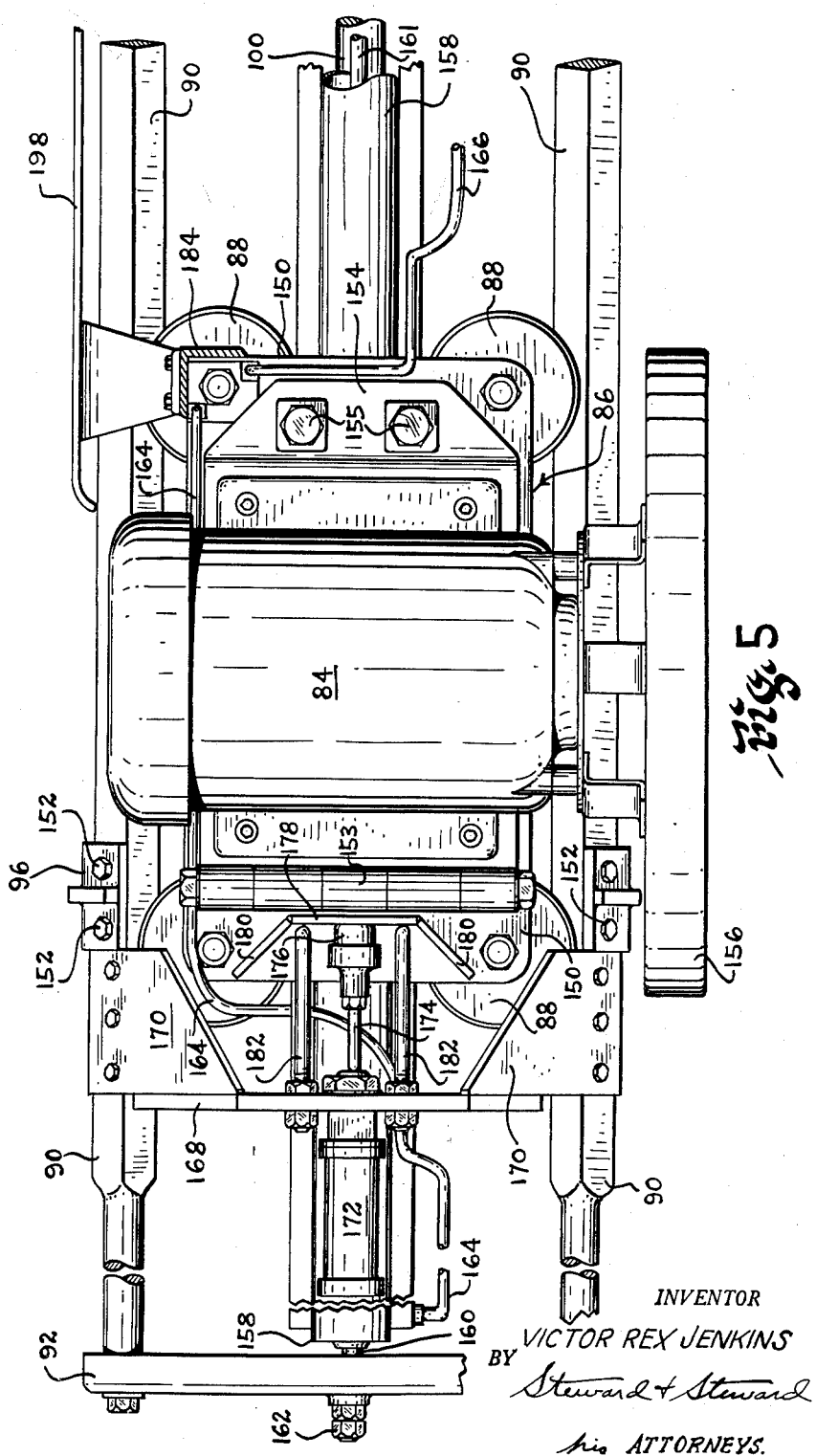
FIG. 5 is a top plan view of the cross-cut table and cutter in its starting position on the cross-track assembly.

Referring now to the cross-cut table 86 and particularly to FIG. 5, the table 86 includes a rectangular base 150, on the four corners of which are journaled wheels 88, which are similar to those on which the forward-travel carriage B is supported. The peripheral V-grooves of wheels 88 straddle the inwardly turned corners of cross-rails 90, each of which is rectangular along the entire central portion, on which table 86 is guided. It will be observed that each of brackets 94, 96 and 97 of the cross-track assembly are located on the under side of cross-rails 90 and are provided with hook-shaped ends 151 which embrace the outer two sides of rail 90 to provide strength while at the same time avoiding interference with the wheels 88, which ride on the opposite or inner two sides of rails 90. Bracket 94, 96 and 97 are each secured to rails 90 by bolts 152 threaded into the outermost sides thereof. Hinged by means of a heavy hinge 153 adjacent one end of base 150 is a motor mounting leaf 154, to which motor 84 is bolted. A pair of large adjusting bolts 155 threaded through the opposite end of mounting leaf 154 extend through leaf 154 into engagement with the upper surface of base 150. By turning down or letting off on adjusting bolts 155, mounting leaf 154 and motor 84 are raised and lowered on hinge 153 for the purpose of raising or lowering the depth of cut made by blade 66. Blade 66 may be provided with a guard 156 bolted to the front end of motor 84 in order to prevent accidental contact with the extremely sharp cutting edge at the periphery of blade 66.

On the under side of base 150 of cross-cut table 86 is rigidly mounted a relatively long double-acting power cylinder 158 extending parallel to cross-rails 90 and somewhat beyond both sides of table 86. Cylinder 158, which is desirably pneumatically operated, has piston rods 160, 161, projecting from both ends. Piston rod 160 is rigidly connected to end-plate 92 as by means of nuts 162, and piston rod 161 is similarly connected to the opposite end-plate 93. Upon introduction of air pressure to the left end (as viewed in FIGS. 1 and 5) of cylinder 158 through air line 164 the cylinder and cross-cut table 86 together are moved to the right on the cross-track assembly across the tread rubber 16 on conveyor belt 12. Before cross-cut table 86 reaches the end of rails 90, air pressure is introduced into the opposite end of power cylinder 158 through air line 166, while being exhausted through line 164, reversing the direction of travel of cross-table 86.

In order to locate the cross-cut table 86 and cutter motor 84 at the starting position to one side of conveyor belt 12, as shown in FIG. 1, a positioning plate 168 is secured in the path of table 86 across the upper sides of rails 90 by means of rugged corner braces 170. Mounted on plate 168 is a spring-loaded hydraulic shock absorber 172 with its cylinder extending outwardly, and a plunger 174 extending inwardly, of plate 168, plunger 174 terminating in a rubber bumper 176. Bumper 176 engages an abutment plate 178 mounted on base 150 of cross-cut table 86 outwardly of hinge 153. In order to strengthen plate 178, braces 180 are welded to it on either side to the upper surface of base 150. When the cross-cut table 86 is moved to the right as shown in FIG. 5 during a cutting operation, plunger 174 immediately moves outwardly from its position shown in the drawing under the urge of a spring in shock absorber 172, so that when the table 86 is returned to its starting position by power cylinder 158, shock absorber 172 cushions the impact of the heavy cutting motor 84 and mounting therefor. A pair of rigid posts 182 mounted, one on each side of plunger 174, on positioning plate 168 extend inwardly therefrom for engagement with abutment plate 178 on table 150 after shock absorber 172 has absorbed the impact of the cross-cut table as it returns to its starting position. Posts 182, therefore, provide a positive stop for table 86 which, except during a cutting stroke, is continuously urged against them by power cylinder 158.

A mast 184, which supports the air hose lines to cylinder 158, is mounted on the upper inner corner of cross-cut table 86. At the top of mast 184 are provided connections for flexible air lines 186, 188 (FIG. 1) for supplying air to cross-travel cylinder 158, as well as the power line (not shown) for motor 84 and a water line (also not shown) for spraying water on the cutter blade 66 for lubricating purposes as it cuts the tread rubber. Mast 184 holds these flexible lines away from the moving parts so that they will not become tangled with each other or in the machine.

As may be seen in FIG. 1, the outer edge of the upper cross-rail 90 carries an elongated bracket 190 extending from cutter lifting cylinder 126 toward end-plate 93 of the cross-track assembly. A pair of limit switches 192 and 194 are adjustably mounted on bracket 190 for movement longitudinally of rails 90. Each switch 192 and 194 has an actuating lever 196 extending forwardly into position for engagement by an actuating bar 198 on cross-cut table 86 as the latter makes a cutting stroke. Actuating bar 198 first engages switch 192, reversing the air to the cutter lifting cylinder 126 for the purpose of raising the blade 66 before the cross-cut table is returned to its starting position. Switch 194 is then engaged by bar 198, reversing the air to the cross-travel cylinder 158 which returns the cross-cut table 86 with cutter motor 84 to its starting position.

Figure 7:
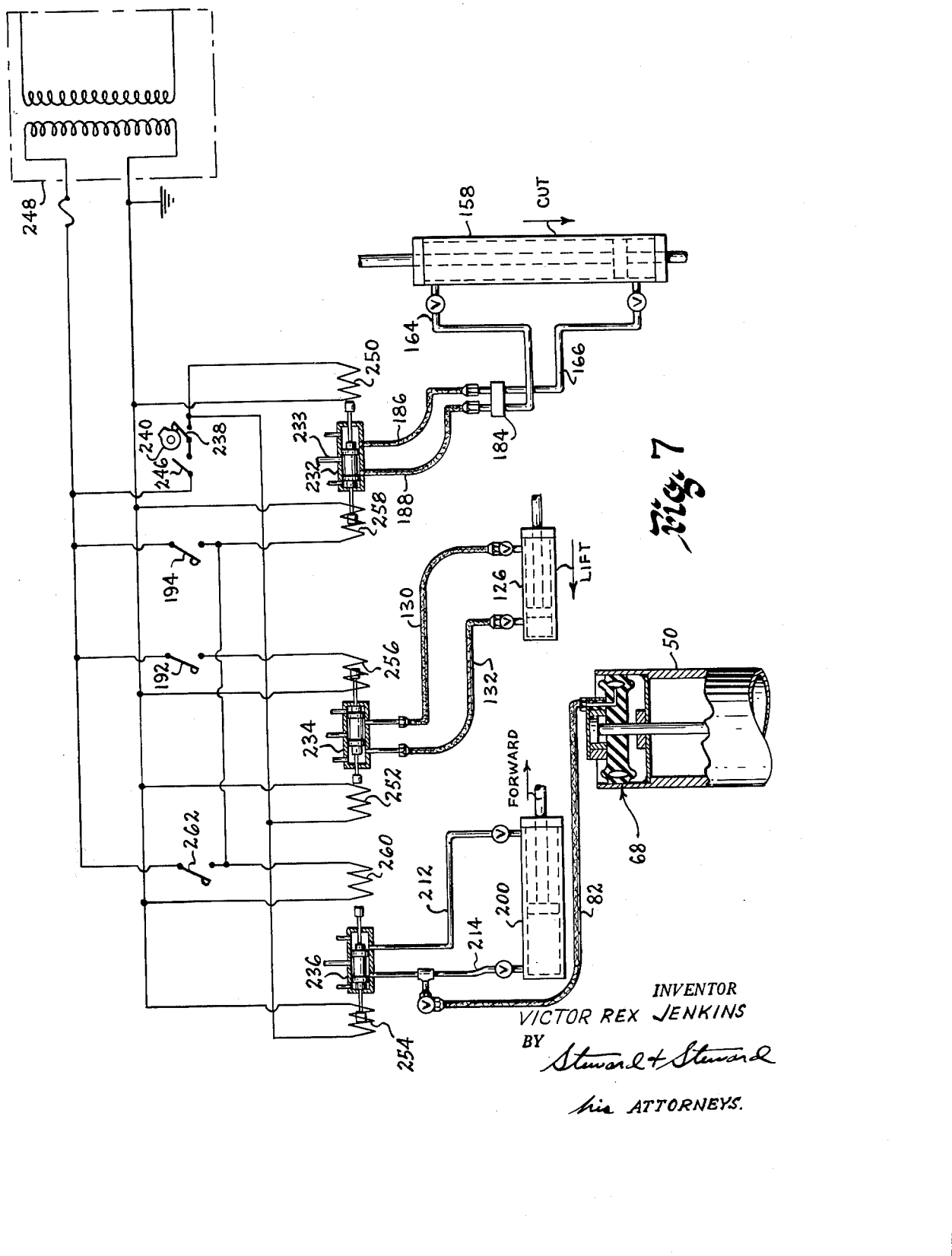
FIG. 7 is a combined wiring diagram of the electrical and pneumatic control systems.

Referring again to the forward-travel carriage B of the tread skiver herein disclosed, it will be apparent that means must be provided for returning carriage B to its starting position on rails 10 at the end of a cutting stroke. Accordingly, a power cylinder 200 (FIG. 3), located in this instance at the rear of main frame A as view in FIG. 1, is suspended below a channel 202 extending across the upper ends of the rear legs 18 of frame A. Cylinder 200 is bolted at its forward end within a reinforced mounting box 204 welded on the forward sides of channel 202 and of a second channel 206 parallel to and spaced below channel 202. Channel 206, like channel 202, is rigid with legs 18 and forms a part of the main frame A. The piston rod 208 of cylinder 200 is attached to the center of the frame of carriage B at the lower flange of the rear beam 32 thereof by means of a suitable connection 210. Cylinder 200 is a double-acting pneumatic cylinder having an air line 212 at its forward end for introducing air pressure in front of the piston so as to draw carriage B back to its starting position after a cut has been made. In addition, in order to ensure a clean cut through the tread rubber, cylinder 200 is adapted to exert a forward thrust on carriage B during the cutting operation for the purpose of making the tread rubber 16 taut at the point where it is severed by blade 66. As shown in FIG. 7, air line 214 is connected to the rear end of cylinder 200 and, as will be more fully explained hereinafter, to the same control valve as the air clutch 68 of friction roller 50 on carriage B so that whenever the carriage B is locked to the conveyor belt 12, it is also forced forwardly in the same direction as belt 12 by cylinder 200.

Adjustable stops 216, similar to stop-elements 136, are mounted in back of each rear corner of carriage B on the upper side of channel 202 of the main frame. Stops 216 engage rearwardly facing abutment plates 218 bolted to the rear corners of side plates 30 of carriage B.

In order to absorb the shock as carriage B is returned to its starting position before it hits stops 216, a shock absorber 224 is bolted to the rear panel 226 of mounting box 204 next to cylinder 200. The rubber bumpered piston rod 228 of shock absorber 224 extends forwardly into engagement with an abutment plate 230 mounted on the rear beam 32 of carriage B.

Each of the three power cylinders 126, 158 and 200 is controlled by a solenoid air valve, illustrated diagrammatically in FIG. 7. A control valve 232 furnishes air under pressure from a suitable source of compressed air (not shown), through a supply line 233 to cylinder 158 on the cross-cut table 86 through one of the flexible air lines 186 and 188, while exhausting air through the other. Similarly, a control valve 234 furnishes compressed air through one or the other of the flexible air lines 130 and 132 to the cutter blade lifting cylinder 126, and air control valve 236 is connected to carriage return cylinder 200 by means of air lines 212 and 214. The air clutch 68 on belt locking roller 50 is connected by means of air house 82 to the air line 214 for cylinder 200 so that whenever cylinder 200 urges carriage B forwardly clutch 68 is engaged, but whenever cylinder 200 returns carriage B to its starting position, clutch 68 is disengaged permitting roller 50 to rotate freely. Control valves 232, 234 and 236 are of the type which are held by air pressure in the position to which they were last pulsed. The speed of operation of the power cylinders is controlled by flow control valves in each of the lines between the control valves and the cylinders, and the system can be operated from a supply of compressed air, which may be for example 100 p.s.i.g.

Operation of each cutting cycle of the apparatus is initiated by a limit switch 238 (FIGS. 2 and 7) actuated by a cam lug 239 on a cam 240 driven at any desired speed by a positive, infinitely variable speed transmission 242, which in turn is driven through a chain 244 by conveyor drive motor 24. As may be seen in FIG. 7, switch 238 is connected through a starting switch 246 to one side of a transformer 248 in a low voltage (desirably 6 to 8 volt) control circuit. When the tread rubber 16 is fed through the skiver on conveyor 12 and it is desired to start cutting the tread into predetermined lengths, starting switch 246 is closed so that a cutting cycle is initiated the next time limit switch 238 is closed by cam 240.

When both starting switch 246 and limit switch 238 are closed, solenoids 250, 252 and 254 are energized so that the control valves 232, 234, 236, respectively, are shifted in order to reverse the pressure on each of the power cylinders and at the same time engage air clutch 68 on roller 50. This causes four things to occur more or less simultaneously: (1) the rotary knife is rocked by cylinder 126 into cutting position, (2) cylinder 158 starts to move cross-cut table 86 on its cutting stroke, (3) clutch 68 engages friction or locking roller 50 so that carriage B is locked to the conveyor belt, and (4) cylinder 200 urges carriage B forward. It will be noted that switch 238 is held closed by cam 240 only long enough to operate the air control valves and then is opened again, de-energizing solenoids 250, 252 and 254. Upon nearing the completion of its cutting stroke, cross-cut table 86, first mechanically actuates switch 192 energizing a solenoid 256 which shifts control valve 234 to reverse the air pressure to the blade lifting cylinder 126 so that blade 66 will be in a raised position for the return stroke of cross-cut table 86. Limit switch 194 is then closed upon further movement of table 86 at the end of the cutting stroke. This energizes a solenoid 258 which shifts control valve 232 in order to reverse the air pressure to cross-travel cylinder 158 so as to stop the cutting stroke of cross-cut table 86 and return it to its starting position. Closing of switch 194 also energizes a solenoid 260, which is in parallel with solenoid 258, shifting control valve 236 so that carriage return cylinder 200 is reversed arresting the forward movement of carriage B and returning it to its starting position. Air clutch 68 is also released at the same time that cylinders 158 and 200 are reversed in order to unlock carriage B from the conveyor belt. A safety switch 262 connected in parallel with switch 194 is positioned for engagement by carriage B at the extreme end of the forward travel of carriage B on frame A in case switch 194 is not actuated by the time carriage B reaches the end of rails 10 on frame A.

In order to vary the length of the strips of tread rubber cut for different size tires or for the purpose of obtaining precise lengths in any given size, it is only necessary to increase or decrease the speed of rotation of cam 240 by adjusting the positive, infinitely variable speed transmission 242. The faster cam 240 operates, the shorter are the strips of tread rubber cut.

It will be noted from the foregoing description of one apparatus embodying the invention that while the structure is rugged, it is relatively simple in design and therefore requires a minimum amount of maintenance in order to keep it in good running order. With the exception of the cross-cut table on which the cutter motor is mounted, all the parts move comparatively slowly and therefore do not wear rapidly. The cross-cut table and motor assembly are well cushioned so that despite the relatively great weight of the motor, which for example may be a 5 horsepower, 1800 r.p.m. motor, no damage is caused by the high speed at which this assembly travels during a cutting stroke. It has been found in practice that a good time for completion of the cutting stroke is one second. However, if desired, the cutting speed can be increased even more than this by using faster operating control switches.

The elapsed time for the actual cutting cycle of the present apparatus, that is, from the instant switch 238 is closed until the cross-cut table returns to its starting position, is the same once the optimum speed for the operation of the cross-cut table has been determined. Consequently, regardless of the rate at which the tread rubber 16 travels on conveyor 12, the time it takes cross-cut table 86 to make a cut and return to its starting position remains the same. However, as the speed of the conveyor is increased, carriage B will travel farther forwardly on frame A, and it will therefore take slightly more time for carriage B to return to its starting position when the conveyor is moving at a faster rate. Accordingly, the total time cycle will vary only by the difference in the time it takes for the return stroke of carriage B for different speeds at which the tread rubber is conveyed.

It will be noted, moreover, that except when the tread rubber travels at the maximum speed for which the skiver is designed, carriage B moves only part of the distance provided by rails 10 on frame A. In fact, when the conveyor moves relatively slowly, only six or eight inches of forward travel of carriage B may be required. This of course is due to the fact that carriage B is returned immediately to its starting position upon completion of the cutting stroke of the cross-cut table 86, and to the fact that cross-cut table 86 is operated at a constant high speed and does not slow down with a reduction in speed of the conveyor, as has been the usual practice heretofore.

In practice it has been found that a machine substantially as described herein can operate continuously at a speed of twenty cuts per minute without difficulty, whereas most tread skivers heretofore have been incapable of making more than ten cuts per minute without constant maintenance and danger of complete breakdown. The present design is believed therefore to at least double the capacity of tread skivers, which have been almost universally looked upon in the industry as serious bottlenecks in the manufacture of rubber tires. Moreover, as will be clear from the foregoing description, any part of the apparatus of the present invention can be tested and adjusted by actual operation without the need for running the conveyor. This facilitates maintenance and reduces the time required in setting up a run. In addition, all the parts are readily accessible for repair or replacement purposes. For example, the saw blade is located where it can be quickly removed and replaced when worn or in need of sharpening.

What is claimed is:

1. Apparatus for transversely cutting elongated sheet material into predetermined lengths comprising in combination:
    (a) a main frame along which said sheet material is conveyed,
    (b) power-driven conveyor means including a flexible belt for conveying said sheet material through the cutting apparatus,
    (c) said main frame having a track extending longitudinally thereof parallel to the direction of travel of said sheet material,
    (d) a carriage supported for reciprocal longitudinal movement along said track and having at least three spaced guide-elements carried thereby extending transversely of said track,
    (e) at least one of said guide-elements comprising a roller journaled on said carriage,
    (f) said conveyor belt being trained about opposite sides of certain of said guide-elements such that said belt is constrained into gripping engagement with said roller,
    (g) cutting means supported by said carriage above said belt on a side thereof opposite said guide-elements for transversely cutting said sheet material, said belt and cutting means being so oriented as to be out of mutual contact at the zone of cut, and
    (h) brake means mounted on said carriage and cooperatively associated with said roller for preventing rotation thereof in order to lock the carriage to the conveyor belt causing the carriage to move along the track in unison with the conveyor belt and sheet material while the sheet material is being cut.

2. Apparatus as defined in claim 1, which further includes power means interposed between said main frame and said carriage for urging the carriage in the direction in which the conveyor belt is traveling while the carriage is locked to the belt when the sheet material is being cut.

3. Apparatus as defined in claim 2, which further includes control means for reversing said power means upon completion of the cutting operation, whereby said power means returns the carriage to its starting position.

4. Apparatus for transversely cutting elongated sheet material into predetermined lengths comprising in combination:
    (a) a main frame along which said sheet material is conveyed,
    (b) power-driven conveyor means including a flexible belt for conveying said sheet material through the cutting apparatus,
    (c) said main frame having a track extending longitudinally thereof parallel to the direction of travel of said sheet material,
    (d) a carriage supported for reciprocal movement along said track and having a pair of guide-elements carried thereby extending transversely of said track,
    (e) said guide-elements being spaced from each other longitudinally of said track and having guide surfaces substantially in the plane of said conveyor belt,
    (f) a friction roller journaled on said carriage intermediate said guide-elements and extending parallel thereto, said friction roller being offset from the plane defined by the guide surfaces of said guide-elements,
    (g) said conveyor belt being disposed so as to travel the full length of said track while being trained over said guide-elements and under said friction roller such that the portion of said conveyor belt between said guide-elements is diverted by said friction roller away from said sheet material,
    (h) cutting means supported by said carriage for transversely cutting said sheet material at a point between said guide-elements, and
    (i) brake means mounted on said carriage and cooperatively associated with said friction roller for stopping its rotation in order to lock the carriage to the conveyor belt causing the carriage to be moved along the track in unison with the conveyor belt and sheet material while the sheet material is being cut.

5. Apparatus as defined in claim 4, wherein said guide-elements are located relative to said friction roller such that said conveyor belt engages a major portion of the cylindrical surface of said friction roller, said friction roller being of a diameter large enough to ensure sufficient engagement with said conveyor belt to prevent slippage of said belt.

6. Apparatus as defined in claim 4, wherein said brake means comprises an air-operated clutch having an expandable resilient element fixed to said carriage and disposed adjacent said friction roller in position to expand into gripping engagement with a cylindrical surface of said roller upon introduction of compressed air into said resilient element.

References Cited in the file of this patent

UNITED STATES PATENTS

| | | |
|---|---|---|
| 2,320,652 | Preston | June 1, 1943 |
| 2,341,870 | Johnston | Feb. 15, 1944 |
| 2,661,707 | Clement | Dec. 8, 1953 |
| 2,696,884 | Mishler | Dec. 14, 1954 |